US008666557B2

(12) United States Patent
Tockert et al.

(10) Patent No.: US 8,666,557 B2

(45) Date of Patent: Mar. 4, 2014

(54) METHOD AND SYSTEM FOR ADJUSTING THE FLOW RATE OF CHARGE MATERIAL IN A CHARGING PROCESS OF A SHAFT FURNACE

(75) Inventors: Paul Tockert, Berbourg (LU); Emile Breden, Luxembourg (LU); Emile Lonardi, Bascharage (LU); Damien Meyer, Ennery (FR)

(73) Assignee: Pau Wurth S.A., Luxembourg (LU)

( * ) Notice: Subject to any disclaimer, the term of this patent is extended or adjusted under 35 U.S.C. 154(b) by 363 days.

(21) Appl. No.: 13/148,676

(22) PCT Filed: Feb. 11, 2010

(86) PCT No.: PCT/EP2010/051733

§ 371 (c)(1), (2), (4) Date: Aug. 10, 2011

(87) PCT Pub. No.: WO2010/092122

PCT Pub. Date: Aug. 19, 2010

(65) Prior Publication Data

US 2011/0311346 A1 Dec. 22, 2011

(30) Foreign Application Priority Data

Feb. 11, 2009 (LU) .......................................... 91526

(51) Int. Cl.
*G05D 11/00* (2006.01)

(52) U.S. Cl.
USPC ............................ 700/282; 414/804; 432/239

(58) Field of Classification Search
USPC ............................ 700/282; 414/804; 432/239
See application file for complete search history.

(56) References Cited

U.S. PATENT DOCUMENTS

| | | | | |
|---|---|---|---|---|
| 3,693,812 | A | 9/1972 | Mahr | |
| 3,929,240 | A | 12/1975 | Legille | |
| 4,071,166 | A * | 1/1978 | Legille et al. | 222/1 |

(Continued)

FOREIGN PATENT DOCUMENTS

| | | | |
|---|---|---|---|
| EP | 0062770 | A1 | 10/1982 |
| EP | 0088253 | A1 | 9/1983 |

(Continued)

OTHER PUBLICATIONS

International Search Report PCT/EP2010/051733; Dated Jun. 16, 2010.

*Primary Examiner* — Mohammad Ali
*Assistant Examiner* — Anthony Whittington
(74) *Attorney, Agent, or Firm* — Cantor Colburn LLP

(57) ABSTRACT

In a charging process of a shaft furnace, in particular of a blast furnace, batches of charge material are typically discharged in cyclical sequence into the furnace from a top hopper using a flow control valve. A method and system is proposed for adjusting the flow rate of charge material in such a process. According to the invention, a respective set of plural valve settings is stored for each batch, each valve setting of a set being associated to a different stage in the discharge of the batch. The method and system are configured to discharge a given batch so that, at each stage in the discharge of the given batch, the flow control valve operates at a constant valve opening according to the valve setting associated to that stage and so that an actual average flow rate at which charge material is discharged is determined for that stage. Further according to the invention, the method and system are configured to correct the plural valve settings offline and in function of the actual average flow rate determined for the associated stage.

18 Claims, 4 Drawing Sheets

(56) References Cited

U.S. PATENT DOCUMENTS

| | | | | |
|---|---|---|---|---|
| 4,074,816 | A | 2/1978 | Legille | |
| 4,074,835 | A * | 2/1978 | Legille et al. | 222/558 |
| 2002/0033124 | A1* | 3/2002 | Asanuma et al. | 110/346 |
| 2002/0130448 | A1* | 9/2002 | Sherwood | 266/173 |
| 2007/0296626 | A1* | 12/2007 | Gnedenko et al. | 342/124 |
| 2008/0006562 | A1* | 1/2008 | Gnedenko et al. | 209/11 |
| 2010/0003904 | A1* | 1/2010 | Duescher | 451/259 |

FOREIGN PATENT DOCUMENTS

| | | | |
|---|---|---|---|
| EP | 0204935 | A1 | 12/1986 |
| EP | 0488318 | A1 | 6/1992 |
| EP | 04198412 | | 7/1992 |
| JP | 56047506 | A | 4/1981 |
| JP | 59229407 | A | 12/1984 |
| JP | 2005206848 | A | 8/2005 |
| WO | 2007082630 | A1 | 7/2007 |

* cited by examiner

| | $\dot{v}$ | $a$ | |
|---|---|---|---|
| | $\dot{v}_1$ | $a_1$ | |
| | $\dot{v}_2$ | $a_2$ | |
| | ⋮ | ⋮ | |
| $\dot{v} \rightarrow$ | $\dot{v}_i$ | $a_i$ | $\leftarrow a$ |
| | $\dot{v}_{i+1}$ | $a_{i+1}$ | |
| | ⋮ | ⋮ | |
| | $\dot{v}_{N-1}$ | $a_{N-1}$ | |
| | $\dot{v}_N$ | $a_N$ | |
Fig. 4
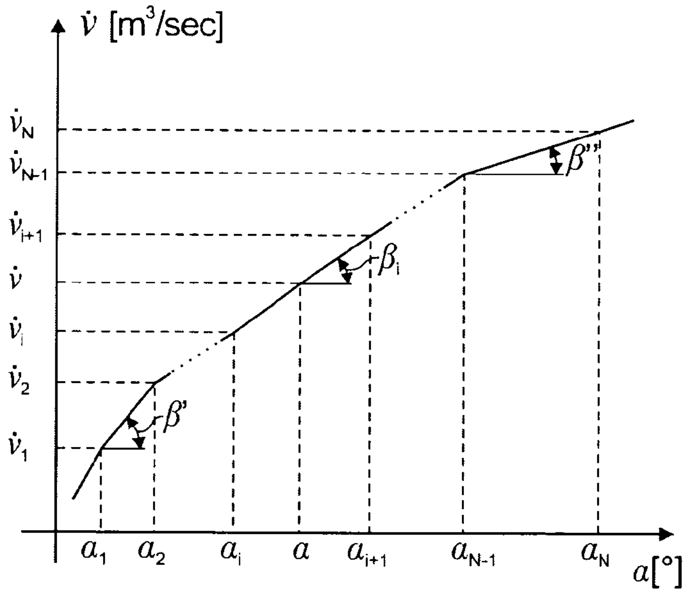
Fig. 5
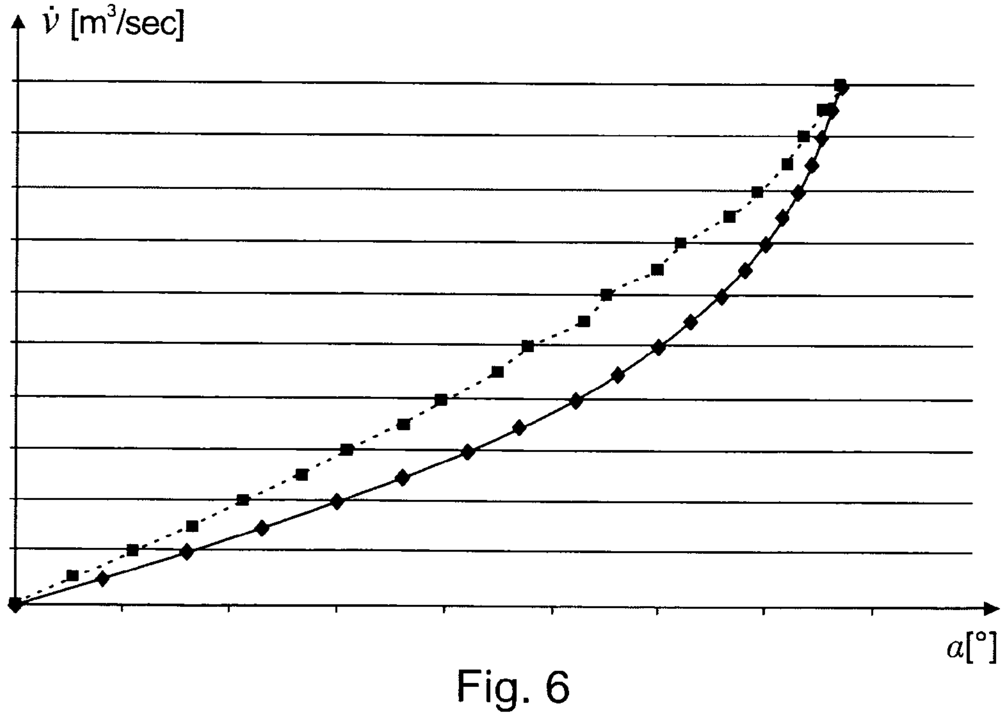
Fig. 6

METHOD AND SYSTEM FOR ADJUSTING THE FLOW RATE OF CHARGE MATERIAL IN A CHARGING PROCESS OF A SHAFT FURNACE

TECHNICAL FIELD

The present invention generally relates to the charging process of a shaft furnace, in particular a blast furnace. More specifically, the present invention relates to a method and a system for adjusting the flow rate of charge material from a top hopper into the furnace using a flow control valve.

BACKGROUND

It is well known that, besides proper burdening of materials, the geometrical distribution of charge material in a blast furnace has a decisive influence on the hot metal production process since it determines among others the gas distribution. In order to achieve a desired distribution profile in view of an optimal process, two basic aspects are of importance. Firstly, material is to be directed to the appropriate geometric locus on the stock-line for achieving a desired pattern, typically a series of closed concentric rings or a spiral. Secondly, the appropriate amount of charge material per unit surface is to be charged over the pattern.

Regarding the first aspect, geometrically well-targeted distribution can be achieved using a top charging installation equipped with a distribution chute that is rotatable about the furnace axis and pivotable about an axis perpendicular to the rotational axis. During the last decades, this type of charging installation commonly referred to as BELL LESS TOP™ has found widespread use throughout the industry among others because it allows directing charge material accurately to any point of the stock-line by appropriate adjustment of the chute rotation and pivoting angles. An early example of such a charging installation is disclosed in U.S. Pat. No. 3,693,812 assigned to PAUL WURTH. In practice, this kind of installation is used to discharge cyclically recurring sequences of charge material batches into the furnace by means of the distribution chute. The distribution chute is typically fed from one or more top hoppers (also called material hoppers) arranged at the furnace top upstream of the chute, which provide intermediate storage for each batch and serve as a furnace gas sluice.

In view of the second aspect, i.e. controlling the amount of material charged per unit surface area, the above-mentioned type of charging installation is commonly equipped with a respective flow control valve (also called material gate) for each top hopper, e.g. according to U.S. Pat. No. 4,074,835. The flow control valve is used for adjusting the flow rate of charge material discharged from the respective hopper into the furnace via the distribution chute to obtain the appropriate amount of charge material per unit surface by means of a variable valve opening.

Flow rate adjustment usually aims at obtaining a diametrically symmetrical and circumferentially uniform weight distribution over the desired pattern, which typically requires a constant flow rate. Another important aim is to synchronize the end of a batch discharge with respect to the end of the pattern described by the distribution chute. Otherwise, the hopper may be emptied before the chute reaches the end of the pattern ("undershoot") or there may remain material to be discharged after the pattern has been fully described by the chute ("overshoot").

Japanese patent applications JP 04 198412, JP 56 047506 and JP 59 229407 propose methods that aim at avoiding undershoot or overshoot. In each of these methods, the valve opening of the flow control valve is fixed during the discharge of a given batch but readjusted for a subsequent discharge in case overshoot or undershoot has occurred. As an alternative to readjusting the valve opening, JP 56 047506 also suggests varying the rotational sped of the distribution chute while maintaining an unchanged valve opening. As will be understood, whilst addressing the problem of undershoot or overshoot, the methods proposed in JP 04 198412, JP 56 047506 and JP 59 229407 do not warrant a constant flow rate required for circumferentially uniform weight distribution over the desired pattern. In fact, with a valve opening that remains constant during the discharge of a given batch, the flow rate inevitably varies during the discharge among others because of the decreasing residual mass that remains in the hopper.

In other known approaches, the valve opening is therefore varied during the time of discharge of a given batch. In a typical approach of this kind, the flow control valve is initially set to a predetermined "average" position i.e. "average" valve opening corresponding to an average flow rate. In practice, the average flow rate is determined in function of the initial volume of the batch stored in the respective top hopper and the time required by the distribution chute for completely describing the desired pattern. The corresponding valve opening is normally derived from one of a set of pre-determined theoretical valve characteristics for different types of material, especially from curves plotting flow rate against valve opening for different types of material. As discussed e.g. in European patent no. EP 0 204 935 a valve characteristic for a given type of material and a given valve may be obtained by experiment. EP 0 204 935 proposes regulating the flow rate by means of "on-line" feedback control during the discharge of a batch in function of the monitored residual weight or weight change of charge material in the discharging top hopper. In contrast to earlier U.S. Pat. Nos. 4,074,816 and 3,929,240, EP 0 204 935 proposes a method which, starting with a predetermined average valve opening, increases the valve opening in case of insufficient flow rate but does not reduce the valve opening in case of excessive flow rate. EP 0 204 935 also proposes updating data indicating the valve position required to ensure a certain output of a particular type of material, i.e. the valve characteristic for a particular type of material, in the light of results obtained from previous charging.

Japanese patent application JP 2005 206848 discloses another method of "on-line" feedback control of the valve opening during the time of discharge of a batch. According to JP 2005 206848, the valve opening is readjusted by means of "dynamic control", which uses integral and proportional control action, in discrete steps or intervals. Each interval corresponds to a full revolution of the rotating distribution chute during the discharge. This on-line "dynamic control" readjusts the valve opening for a subsequent interval during the discharge in function of residual weight to be discharged and remaining discharge time. In addition, JP 2005 206848 proposes applying two calculations, a "feed forward" correction and a "feed back" correction, to determine more accurately the required initial valve opening for the first discharge interval i.e. the first chute revolution.

European patent EP 0 488 318, discloses another method of flow rate regulation by means of real time control of the degree of opening of the flow control valve and also suggests the use of tables that represent the relationship between the degree of opening and the flow rate according to different kinds of material akin to the above-mentioned valve characteristic. EP 0 488 318 proposes a method aiming at obtaining a constant ratio of flow rate to (average) grain diameter during the discharge in view of achieving a more uniform gas flow distribution.

The practice of "on-line" flow regulation according to EP 0 204 935 is currently widespread. Despite its obvious benefits regarding circumferentially uniform weight distribution, this approach leaves room for improvement. For instance, it is deemed not sufficiently adaptive to a wider variety of batch properties, e.g. to batches consisting of a mixture of different charge materials, or to a wider variety of operating conditions of the top charging installation. Moreover, known approaches of "on-line" feedback control, e.g. according to EP 0 204 935 or JP 2005 206848, require accurate selection and tuning of the control parameters to achieve good results.

BRIEF SUMMARY

The invention provides both a simplified method and simplified system for adjusting the flow rate of charge material in shaft furnace charging.

The present invention relates to a method of adjusting the flow rate of charge material in a charging process of a shaft furnace, in particular of a blast furnace. Such charging process typically involves a cyclic succession of batches of charge material, which form a charging-cycle and are discharged into the furnace from a top hopper using a flow control valve. As will be understood, a batch thus represents a given quantity or lot of charge material, e.g. one hopper filling or load, to be charged into the furnace in one of the several operations that constitute a charging-cycle.

According to the proposed method, a respective set of plural valve settings is stored for each batch. As will be understood, plural settings in the present context means more than one setting and typically multiple settings. Each valve setting of a set is associated to a different stage of the discharge of the respective batch for which the set is stored. Preferably, each batch discharge process is divided into subsequent stages or periods so that each stage corresponds to different operating status of a distribution device used for distributing the discharged batch. In particular, each stage preferably corresponds to a different pivoting position of a distribution chute of the distribution device.

According to the proposed method, a given batch of a charging-cycle is discharged with the flow control valve being set for each stage in accordance with the valve setting associated to the stage in question. Hence, the valve opening remains constant during each stage of the discharge respectively while it can change from stage to stage. Furthermore, at each different stage an actual average flow rate at which charge material is discharged is determined.

According to the proposed method, a main aspect of adjusting the flow rate lies in correcting each of the plural valve settings used for operating the flow control valve. More specifically, each valve setting for a given batch is corrected in offline manner, e.g. immediately after the given stage of a discharge is completed or after the batch is completely discharged or even just before a subsequent discharge of the given batch. For each valve setting, correction is made in function of the actual average flow rate determined for the stage to which the valve setting is associated.

It will be appreciated that flow rate adjustment is simplified and rendered more robust by virtue of the "offline" nature of the valve setting correction according to the invention. Among others, the need for selecting and fine-tuning control parameters, as required with prior art "on-line" feedback control methods, is eliminated. The proposed method is not subject to instability and unsatisfactory results due to improper control parameters or changes in the batch properties. Furthermore, while "on-line" regulation according to the principles of EP 0 204 935 or JP 2005 206848 involves the need for properly determining the initial valve opening for starting a discharge, this need is eliminated by the proposed method. In addition, the proposed approach of flow rate adjustment adapts automatically to changes in the operating conditions of the top charging installation from stage to stage during a discharge, e.g. closure of the flow control valve, and also in between batches.

In accordance with the invention, the system mainly comprises memory means storing the respective set of plural valve settings for each batch and a suitable programmable computing means (e.g. a computer or PLC) programmed to perform the key steps of the proposed method as summarized above.

BRIEF DESCRIPTION OF THE DRAWINGS

A preferred embodiment of the invention will now be described, by way of example, with reference to the accompanying drawings in which:

FIG. 4 is a table of a specific valve characteristic expressed as a sequence of discrete valve setting values (opening angle $\alpha$ of FIG. 1) and an associated sequence of discrete average flow rate values;

FIG. 5 is a graph of a curve illustrating the specific valve characteristic of FIG. 4;

FIG. 6 is graph of curves illustrating an initial specific valve characteristic (solid line) and a corrected specific valve characteristic (broken line);

DETAILED DESCRIPTION

Figure 1:
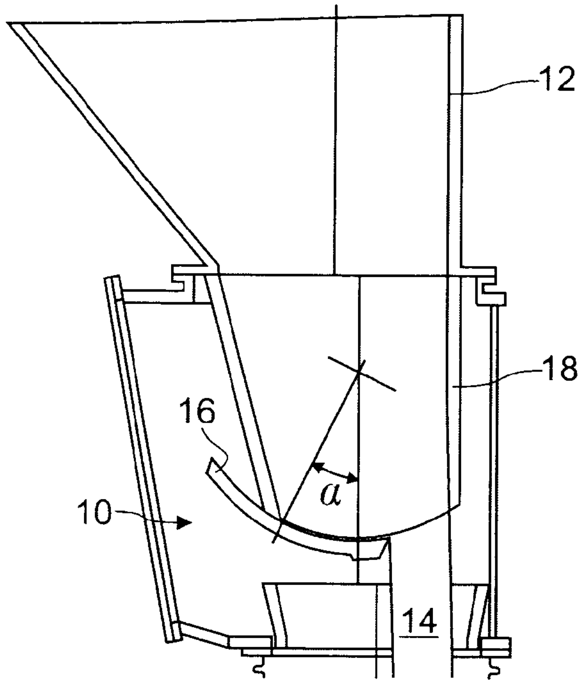
FIG. 1 is a schematic vertical cross sectional view of a flow control valve associated to a top hopper of a blast furnace charging installation.

FIG. 1 schematically illustrates a flow control valve 10 at the outlet of a top hopper 12 in a blast furnace top charging installation, e.g. according to PCT application no. WO 2007/082630. During batchwise discharge of charge material, the flow control valve 10 is used to control the (mass or volumetric) flow rate. As is well known, for a proper charging profile, the flow rate has to be coordinated with the operation of a distribution device to which material is fed in form of a flow 14 as illustrated in FIG. 1. Typically, the flow rate is to be coordinated with the operation of a rotating and pivoting distribution chute (not shown). As will be understood, the flow rate is a process variable determined primarily by the valve opening (aperture area/open cross-section) of the valve 10.

In the embodiment illustrated in FIG. 1, the flow control valve 10 is configured according to the general principles of U.S. Pat. No. 4,074,835, i.e. with a pivotable throttling shutter 16 slewing in front of a channel member 18 of generally octagonal or oval cross-section. In this embodiment, the controllable valve setting (manipulated variable) is the opening angle α of the valve 10 which determines the pivotal position of the shutter 16 and thereby the valve opening. Hereinafter the symbol "α" is expressed e.g. in [°] and represents the valve setting for the valve 10 of FIG. 1 merely for the purpose of illustration. In fact, the present invention is not limited in its application to a specific type of flow control valve. It is equally applicable to any other suitable design such as those disclosed in European patent no. EP 0 088 253, in which the manipulated variable is the axial displacement of a plug-type valve, or in European patent no. EP 0 062 770, in which the manipulated variable is the aperture of an iris-diaphragm-type valve.

Figure 2:
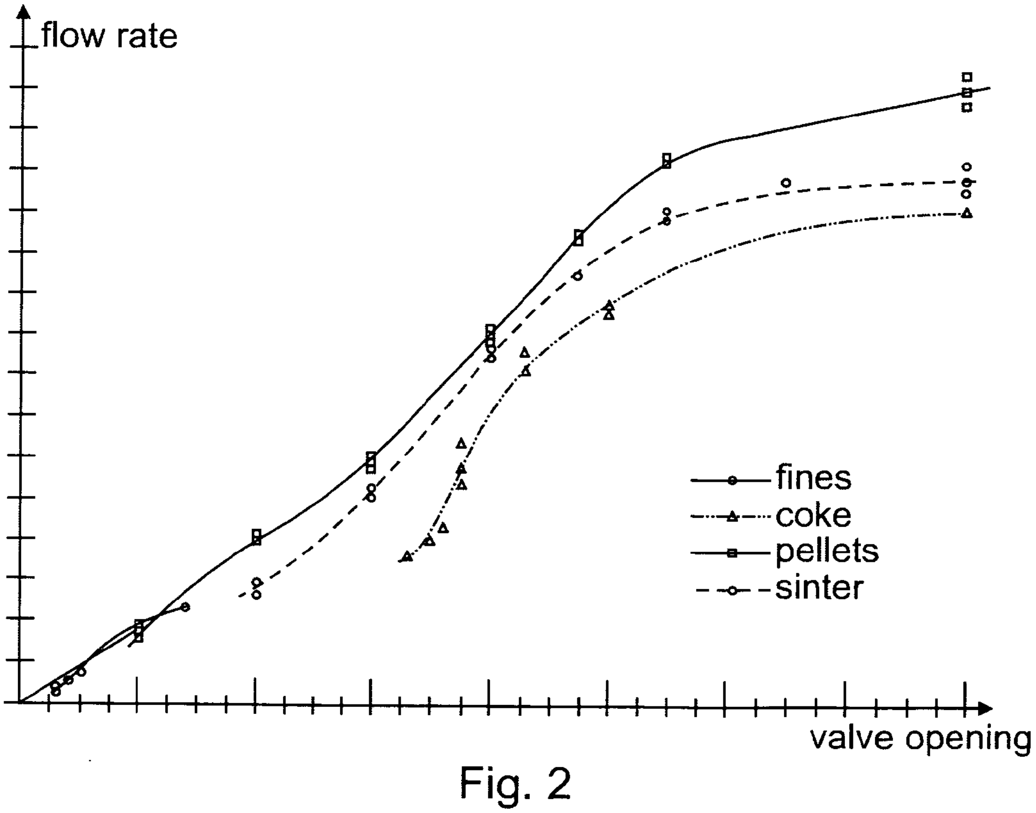
FIG. 2 is a graph illustrating a family of pre-determined characteristic curves plotting flow rate against valve setting as determined by measurement for different types of material and a specific flow control valve.

FIG. 2 illustrates curves plotting flow rate against valve setting for different types of material respectively, namely agglomerated fines, coke, pellets and ore, for a given type of flow control valve (the curves of FIG. 2 are of a plug-type flow control valve of the type as disclosed in EP 088 253). Each curve is obtained empirically in known manner, i.e. based on flow rate measurements for different valve settings using a representative batch of a given material type having typical properties, in particular granulometry and total batch weight. Curves as illustrated in FIG. 2 thus express a pre-determined generic valve characteristic pertaining to a certain material type.

Valve Characteristic Correction Mode

This section describes, with reference to FIGS. 3-6, a preferred mode of obtaining and correcting batch-specific valve characteristics, termed "valve characteristic correction mode".

Figure 3:
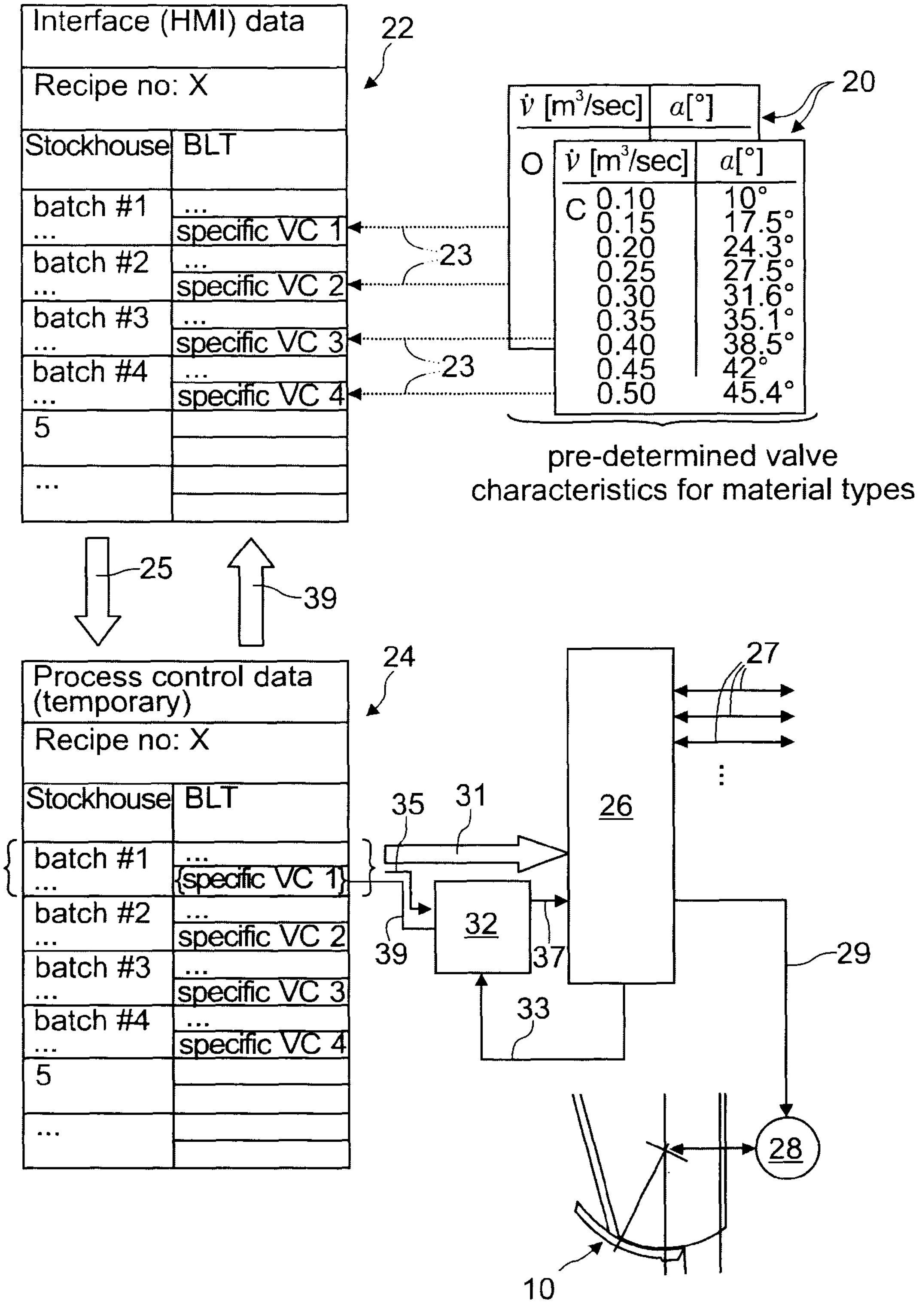
FIG. 3 is a flow chart schematically illustrating data flow in connection with obtaining and correcting a specific valve characteristic for each batch of charge material.

As illustrated in FIG. 3, a limited number of pre-determined valve characteristics 20 are provided to indicate the relationship between flow rate and valve setting of the flow control valve 10 as pertaining to a certain type of material. For instance, only two master characteristics, one for coke type material ("C") and one for ferrous type material ("O"), are provided as shown in FIG. 3 although further possible pre-determined characteristics, e.g. for sinter type material and pellets type material respectively (see FIG. 2), are not excluded. Pre-determined valve characteristics 20 are provided in accordance with the material types used in a desired charging-cycle and obtained in known manner, e.g. as set out above in relation to FIG. 2. The pre-determined characteristics 20 are stored in any suitable format in a data storage device, e.g. a hard disk of a computer system implementing a human-machine-interface (HMI) for user interaction with the process control of the blast furnace charging operation or in retentive memory of a programmable logic controller (PLC) of the process control system.

FIG. 3 further illustrates a diagram of a first data structure 22 labeled "Interface (HMI) data" comprising data items related to process control of the charging process. The data structure 22 is used in the HMI and holds a current set of user-specified settings and parameters, i.e. a "recipe" for control of the charging process. It may have any appropriate format to contain data (" . . . " in column "BLT") suitable for process control of the charging installation, e.g. for choosing the desired charging pattern, and (" . . . " in column "Stockhouse") for process control of an automated stockhouse, e.g. for supplying the desired weight, material composition and arrangement of the batches. For each batch a respective data record is provided as illustrated by rows in the tabular representation of the data structure 22 in FIG. 3 (see identifier "batch #1" . . . "batch #4"). For the purpose of stockhouse control, each batch data record includes at least data indicative of the material composition of the batch to which the data record is associated. For the purposes of the present, the expression "record" refers to any number of related items of information handled as a unit, irrespectively of any specific data structure (i.e. does not necessarily imply use of a database).

As illustrated in FIG. 3, a specific valve characteristic "specific VC1"; "specific VC2", "specific VC3", "specific VC4" is stored for each batch so that a respective specific valve characteristic is dedicated i.e. bijectively associated to each batch. Like the pre-determined characteristics 20, each specific valve characteristic also indicates the relation between flow rate and valve setting. More specifically, each specific characteristic "specific VC1" . . . "specific VC4" expresses a relationship between an average flow rate value and the manipulation input used as setting for controlling the flow control valve 10. In fact, due to wear of the valve shutter 16 the actual valve opening may vary for a same valve setting a during lifetime of the flow control valve 10.

As will be understood, instead of pertaining to a certain type of material, each of the valve characteristics "specific VC1" . . . "specific VC4" is specific to one batch i.e. it expresses the aforesaid relationship for the one particular batch to which it is associated. This bijection can be implemented in simple manner by storing a specific valve characteristic as a data item of the respective data record "batch #1" . . . "batch #4" existing for the associated batch in an embodiment as illustrated in FIG. 3. Other suitable ways of storing the specific valve characteristics (e.g. in a separate data structure) are of course within the scope of the invention. As further illustrated by arrows 23 in FIG. 3, when batch data is created (e.g. by user-entry) each specific valve characteristic "specific VC1" "specific VC4" is initialized to reflect one of the pre-determined valve characteristics ("O"/"C"), which is preferably chosen in accordance with a predominant type of material contained in the batch in question. The latter information can be derived from stockhouse control data of the data record "batch #1" . . . "batch #4", which as stated includes at least data indicative of the material composition. If compatible formats are used (see below) the specific valve characteristics "specific VC1" . . . "specific VC4" may simply be initialized as copies of the appropriate pre-determined valve characteristic 20. As will be noted, initialization as illustrated by arrows 23 is only required once, namely before the "recipe" reflected by the contents of the data structure 22 is put into production for the first time i.e. when no earlier specific valve characteristics are available (see below).

As further seen in FIG. 3, a temporary second data structure 24, labeled "Process control data", is derived from the first data structure 22 in a step illustrated by arrow 25. Depending on design particularities of the HMI and process control system to be used, the second data structure 24 may be initialized as an identical or similar copy of the first data structure 22 and is stored in data memory, typically non-retentive memory, of a programmable computing device, e.g. a PC type computer system implementing the HMI, a local server or a PLC of a process control system. The content of the data structure 24 is used as "working copy" for actual process control purposes. Similar to the first data structure 22, the second data structure 24 includes several data records "batch #1" . . . "batch #4", each defining properties of a batch to be charged and furnace top charging parameters (column "BLT") including a dedicated specific valve characteristic "specific VC1" . . . "specific VC4" for each defined batch (illustrated by a gray-shaded row in the tabular representation of FIG. 3).

FIG. 3 schematically illustrates a process control system 26 of known architecture, e.g. a network of PLCs connected to an appropriate server. In known manner, the process control system 26 communicates with the automation components of the stockhouse (e.g. weighing bins, weighing hoppers, extractors, conveyors, etc.) and the top charging installation (e.g. drive unit of a rotatable and pivotable distribution chute, hopper sealing valves, weighing equipment, etc.) as indicated by arrows 27. As illustrated by FIG. 3, the process control system 26 controls the flow control valve 10, typically via an associated valve controller 28. Hence, as illustrated schematically by arrow 29, the process control system 26 provides the manipulation input used as setting for controlling the flow control valve 10 by the controller 28.

In a step illustrated by arrow 31, relevant data required for process control is derived from a data record e.g. "batch #1" of the temporary data structure 24 as illustrated in FIG. 3 and provided to the process control system 26. To this effect, the second data structure 24 may be stored in a memory external to the process control system 26 or internal to the latter, e.g. within a PLC of the process control system 26 itself.

In relation to obtaining and correcting a batch-specific valve characteristics for a given batch, e.g. in accordance with data record "batch #1" as illustrated in FIG. 3, the following data processing steps are carried out:

a) determining a flow rate setpoint (prior to discharge);

b) deriving a requested valve setting that corresponds to the flow rate setpoint from the appropriate specific valve characteristic (prior to discharge);

c) determining an actual average flow rate at which the given batch was discharged (after discharge);

d) correcting the stored specific valve characteristic associated to the given batch if appropriate, i.e. in case of a stipulated deviation between the flow rate setpoint and the determined actual average flow rate (after discharge).

The above step d) is preferably performed by a software module 32 implemented on the computer system that provides the HMI. The above steps a) to c) are preferably implemented on an existing process control system 26 as illustrated in FIG. 3. Other implementations of steps a) to d) on either the process control system 26 or the HMI computer system or distributed on both are also within the scope of the present disclosure.

In the valve characteristic correction mode, the module 32 operates in particular on the specific valve characteristic of the given batch to be discharged. To this effect, the specific valve characteristics "specific VC1" . . . "specific VC4" may have any appropriate format in terms of data structure. They may be stored in the form of an ordered e.g. array-type collection of pairs of flow rate values and valve setting values ($\dot{V}_i;\alpha_i$) representing a discretization that approximates a true characteristic curve. In even simpler form, instead of storing both values of a pair, it may suffice to store a singleton sequence (ordered list) of valve setting values $\alpha_i$ (right hand column of tabular representation in FIG. 4) as discrete points or samples taken at fixed flow rate intervals $\delta\dot{V}=\dot{V}_{i+1}-\dot{V}_i$ or vice-versa since the sequence index i allows determining the corresponding fixed-interval sequence. For the purpose of illustration, the specific valve characteristics are hereinafter considered in the form of an indexed array of pairs ($\dot{V}_i;\alpha_i$) as illustrated in FIG. 4, in which the flow rate is expressed in fixed steps $\delta\dot{V}=\dot{V}_{i+1}-\dot{V}_i$. e.g. of 0.05 $m^3/s$, while other suitable forms of digitizing a characteristic are considered to be within the scope of the invention.

Preferred embodiments of the above steps a) to d) are as follows:

a) Determining the Flow Rate Setpoint

Before discharging a given batch, a flow rate setpoint $\dot{V}_S$ is calculated, typically by dividing the net weight of the batch by the targeted total batch discharging time, the result multiplied by the average density of this batch (for volumetric flow rates). The net weight is typically determined using suitable hopper weighing equipment, e.g. as disclosed in U.S. Pat. No. 4,071,166 and U.S. Pat. No. 4,074,816. The process control system 26, to which the weighing equipment is connected, inputs the weighing results or the calculated flow rate setpoint to the module 32 as illustrated by arrow 33. The targeted discharging time corresponds to the time required by the distribution device to complete the desired charging pattern. This time is pre-determined by calculation, e.g. in function of the length of the desired charging pattern and the chute motion speed. Targeted discharging time and average density are included as a data item in the respective record, e.g. "batch #1", of the temporary data structure 24, and input to the control system 26 according to arrow 31 or to the module 32 according to arrow 35 depending on where step a) is implemented.

b) Deriving the Requested Valve Setting from the Specific Valve Characteristic

For discharging a given batch, the associated specific valve characteristic, e.g. "specific VC1" for "batch #1" in FIG. 3, as currently stored is input to the module 32 according to arrow 35. Having determined the flow rate setpoint (see section a) above), the requested valve setting α that corresponds to the flow rate setpoint $\dot{V}_S$ is derived from the specific valve characteristic of the given batch by linear interpolation as best illustrated in FIGS. 4-5.

More specifically, the adjacent flow rate values $\dot{V}_i;\dot{V}_{i+1}$ in the specific valve characteristic between which the flow rate setpoint $\dot{V}_S$ is comprised are determined according to inequality:

$$\dot{V}_i \le \dot{V}_S < \dot{V}_{i+1} \tag{1}$$

and used, in conjunction with their associated valve setting values $\alpha_i;\alpha_{i+1}$ for interpolation of the requested valve setting value α according to equation:

$$\alpha = \alpha_i + (\dot{V}_s - \dot{V}_i) \cdot \frac{\alpha_{i+1} - \alpha_i}{\dot{V}_{i+1} - \dot{V}_i} \tag{2}$$

with i determined such that $\alpha_i \le \alpha < \alpha_{i+1}$.

For example, with the values in as illustrated in FIG. 3 (for pre-determined valve characteristic "C") and rounding the result to a precision of 0.1°, the requested opening angle as valve setting for a flow rate setpoint of 0.29 $m^3/s$ according to equation (2) is α=29.5°.

Before starting the discharge of the given batch, the module 32 outputs the requested valve setting α determined according to equation (2) to the process control system 26 as illustrated by arrow 37. The process control system 32 in turn outputs the requested valve setting α in form of a suitable signal as manipulation input (valve control setpoint) to the controller 28 to operate the control valve 10 (see arrow 29).

c) Deriving the Actual Average Flow Rate

After the given batch has been discharged, the actual time required for the discharge is known (e.g. by means of the weighing equipment or other suitable sensors such as vibration transmitters) so that, similar to determining the flow rate setpoint, the actual average flow rate at which the given batch was discharged can be determined according to:

$$\dot{V}_{real} = \frac{W \cdot \rho_{avg}}{t_{real}} \tag{3}$$

with $\dot{V}_{real}$ being the actual average flow rate, W being the total net batch weight, e.g. as obtained from the weighing equipment connected to the process control system 26, $\rho_{ang}$ being the average batch density (e.g. obtained from the data record according to arrow 35) and $t_{real}$ being the time that discharging the given batch actually took. The result $\dot{V}_{real}$ is input to the module 32 according to arrow 33 if step c) is implemented on the process control system.

d) Correcting the Specific Valve Characteristic Associated to the Given Batch

After the batch has been completely discharged, the actual average flow rate $\dot{V}_{real}$ is compared with the flow rate setpoint $\dot{V}_S$. In case of a stipulated deviation (control variance) between them, a correction of the specific valve characteristic is considered necessary in order to gradually minimize such deviation over subsequent discharges of identical batches, e.g. according to data record batch #1. In other words, such correction causes gradual adjustment of the flow rate to the desired setpoint. In the valve characteristic correction mode, such correction is the main function of the module 32 and preferably carried out as follows:

The difference between the flow rate setpoint and the actual flow rate is calculated according to:

$$\Delta\dot{V} = \dot{V}_S - \dot{V}_{real} \tag{4}$$

A stipulated deviation is considered to have occurred in case the absolute value of the resulting difference according to (4) satisfies the inequality:

$$T_1 \cdot \dot{V}_S > |\Delta\dot{V}| > T_2 \cdot \dot{V}_S \tag{5}$$

with $T_1$ being a maximum tolerance factor used to set the maximum deviation beyond which no correction is performed and $T_2$ being a minimum tolerance factor used to set the minimal deviation required to perform a correction of the specific valve characteristic. In case of a deviation $|\Delta\dot{V}| > T_1 \cdot \dot{V}_S$ an alarm is preferably generated by the HMI to indicate abnormal conditions. Suitable values may be e.g. $T_1=0.2$ and $T_2=0.02$.

Although correcting the flow rate values and maintaining valve setting values (as sampling intervals) is theoretically possible, it is considered preferred to perform correction on the valve setting values while maintaining unchanged flow rate values. Furthermore, for maintaining a consistent characteristic, correction is preferably performed by adjusting each and every of the individual valve setting values $\alpha_i$ of the sequence by applying a respective correction term to each valve setting values $\alpha_i$. The respective correction term is preferably determined using a function chosen to increase with the actual deviation $\Delta\dot{V}$ and to decrease with the difference, preferably with the distance in terms of sequence index, between the valve setting value to be corrected and the valve setting value that approximates or is equal to the requested valve setting value. Accordingly, the magnitude of the correction term will vary in accordance with $\Delta\dot{V}$ while it will be smaller the more "remote" the setting value to be corrected is from the requested valve setting $\alpha$ as determined e.g. by equation (2). In a preferred embodiment this correction term is determined as follows:

For the requested valve setting $\alpha$, the corrected valve setting value that would have been required to achieve the requested flow rate setpoint is:

$$\alpha' = \alpha + \Delta\alpha \tag{6}$$

with $$\Delta\alpha = \Delta\dot{V} \cdot \frac{\alpha_{i+1} - \alpha_i}{\dot{V}_{i+1} - \dot{V}_i} \tag{7}$$

using the notations of equations (2) and (4).

Accordingly, a respective correction term $C_n$ for each of the valve setting values $\alpha_n$ respectively is determined as follows:

$$C_n = \begin{cases} \frac{\Delta\alpha_n}{K_1} \cdot \left(\frac{N-n}{N-i-1}\right), & \alpha_n > \alpha, n > i \\ \frac{\Delta\alpha_n}{K_1} \cdot \left(\frac{n-1}{i-1}\right), & \alpha_n \le \alpha, n \le i \end{cases} \tag{8}$$

with $$\Delta\alpha_n = \Delta\dot{V} \cdot \frac{\alpha_{n+1} - \alpha_n}{\dot{V}_{n+1} - \dot{V}_n} \tag{9}$$

The respective correction term $C_n$ resulting from equation (8) is then applied to each valve setting of the given specific valve characteristic:

$$\alpha_n' = \alpha_n + C_n; n = 1 \ldots N \tag{10}$$

where $\alpha_n'$ is the corrected valve setting value, $\alpha_n$ is the currently considered (uncorrected) valve setting value in the sequence, $\dot{V}_n$ is the corresponding average flow rate according to the current (uncorrected) characteristic, i identifies the sequence index such that $\alpha_i \le \alpha < \alpha_{i+1}$, N is the total number of values in the specific valve characteristic (sequence length), n is the sequence index (position in the sequence according to the table of FIG. 4) and $K_1$ is a user-defined constant gain factor that allows to prevent overcorrection (instability) by limiting the correction term $C_n$, with preferred values being $5 \ge K_1 \ge 2$.

Correction is preferably limited according to:

$$\alpha_n' = \begin{cases} \alpha_{min}, & \alpha_n + C_n < \alpha_{min} \\ \alpha_n + C_n, & \alpha_{min} \le \alpha_n + C_n \le \alpha_{max} \\ \alpha_{max}, & \alpha_n + C_n > \alpha_{max} \end{cases} \tag{11}$$

with $\alpha_{min}$ and $\alpha_{max}$ being the minimum and maximum allowable valve settings respectively. As will be understood, other suitable functions may be used for computing a correction term $C_n$ the magnitude of which increases with an increasing actual deviation $\Delta\dot{V}$ and decreases with an increasing difference between the valve setting to be corrected $\alpha_n$ and the requested valve setting $\alpha$.

In a further step, the module 32 preferably ensures that the sequence of valve setting values is strictly monotonically increasing, e.g. by running a program code sequence as follows (in pseudo-code):

```
FOR j=1 to N−1
    WHILE α'j+1 ≤ α'j THEN
        α'j+1 = α'j + 0.1°
    WEND
NEXT j
```

whereby any valve setting value that is less than or equal to the valve setting value that precedes in sequence is incremented until a strict monotonically increase is reached so as to ensure a positive slope of the characteristic curve.

After completion of the computations, the module 32 corrects each of the valve setting values of the specific valve characteristic under consideration by replacing $\alpha_n$ with $\alpha_n'$ for n=1 . . . N. FIG. 6 illustrates a possible result of correction as set out above with a solid-lined curve representing the initial uncorrected specific valve characteristic and a broken-lined curve representing the corrected specific valve characteristic, based on pairs of flow rate values and valve setting values $(\dot{V}_i;\alpha_i)$.

An exemplary program sequence in pseudo-code for performing the above correction calculations is as follows:

SEQUENCE

Characteristic flow curve correction

```
--before discharging--
"Find index below value in characteristic curve"
IF $\dot{V}_{SP}$ ≠"" ("Flowrate setpoint ≠ """) THEN
  α = GetAlpha($\dot{V}_{SP}$)
  MaterialGateSP = α
  LastFlow = Flowrate setpoint
  Flowrate setpoint = ""
ELSE
  MaterialGateSP = ""
END IF
--after discharging--
IF BLT results transmitted = 1 THEN
  $\Delta\dot{V} = \dot{V}_{Last} - \dot{V}_{actualmeasured}$
  N = Number_of_rows_of_characterisitc_curve
  "Do correction if error is beyond tolerance"
  IF $|\Delta\dot{V}| > T_1 \cdot V_{Last}$ AND $|\Delta\dot{V}| \le T_2 \cdot V_{Last}$ THEN
    FOR n = 1 TO N
      IF n = 1 THEN
        Corrected curve values = 0
      ELSE
        IF n > i AND n ≠ 1 THEN
          $\Delta\alpha = \Delta\dot{V} \cdot \frac{(\alpha_n - \alpha_{n-1})}{(V_n - V_{n-1})}$
          $\text{Correctedcurve}_n = \alpha_n + \frac{\Delta\alpha}{K_1} \cdot \frac{N-n}{N-i-1}$
        ELSE
          $\Delta\alpha = \Delta\dot{V} \cdot \frac{(\alpha_{curve,n} - \alpha_{curve,n-1})}{(V_{curve,n} - V_{curve,n-1})}$
          $\text{Correctedcurve}_n = \alpha_{curve,n} + \frac{\Delta\alpha}{K_1} \cdot \frac{n-1}{i-1}$
        END IF
      END IF
    NEXT n
    "to avoid negative inclination of the corrected characteristic curve"
    FOR n = 2 TO N
      WHILE $\text{Correctedcurve}_n - \text{Correctedcurve}_{n-1} < 0$
        $\text{Correctedcurve}_n = \text{Correctedcurve}_n + 0{,}1$
      WEND
    NEXT n
  ELSE IF $|\Delta\dot{V}| > T_2 \cdot V_{LAST}$ THEN
    RETURN MESSAGE "Flow rate difference too big -> no correction"
  ELSE
    RETURN MESSAGE "Flow rate difference too small -> no correction"
  END IF
  BLT results transmitted = ""
ELSE
  Exit SEQUENCE
END IF
```

FUNCTIONS

```
Function GetAlpha($\dot{V}$)
i = 1
IF $\dot{V}$ < > 0 THEN
  WHILE $\dot{V}_i < \dot{V}$ "Flow rate with index i of the characteristic curve < Flow
  rate setpoint"
    i = i + 1
  WEND
  i = i - 1
  $\text{GetAlpha} = \alpha_i + (\dot{V} - \dot{V}_i) \cdot \frac{(\alpha_{i+1} - \alpha_i)}{(\dot{V}_{i+1} - \dot{V}_i)}$
END IF
End Function
```

After a correction has been made, the module 32 returns the resulting corrected specific valve characteristic as illustrated by arrow 39 in FIG. 3. This output is used in the valve characteristic correction mode for updating the specific valve characteristic currently stored for the batch in question, e.g. "specific VC 1" for batch #1. By repeating the above procedure for each batch of a charging cycle and at each discharge respectively, the respective flow rate is gradually (after each discharge) adjusted to the desired flow rate setpoint. Furthermore, using the updated specific valve characteristic in the data structure 24, the corresponding specific valve characteristic stored in the HMI data structure 22 as identified using the batch identifier ("batch #1") and recipe identifier ("recipe no: X") is also updated, as illustrated by arrow 41 in FIG. 3. Thereby, flow rate deviations are reduced or eliminated at future uses of the same "recipe" (there being no future initialization according to arrows 23 once an update according to arrow 41 has been made for a given recipe).

Although the valve characteristic correction mode as described above refers to a single specific valve characteristic per batch, it will be understood that, in case of a multiple-hopper installation, a dedicated specific valve characteristic for each flow control valve is stored for each batch respectively and corrected when the respective flow control valve is used. Equivalently, identical material lots, i.e. having identical desired weight, material composition and arrangement as provided from the automated stockhouse, are preferably considered to be different batches whenever they are stored in different hoppers of a multiple-hopper installation.

According to the preferred embodiment, the valve characteristic correction mode described above is initially executed during several charging cycles to provide reliable specific valve characteristics. Afterwards, these characteristics are used in adjusting the flow rate according to a subsequent second mode of operation which will be detailed below. Other approaches of obtaining valve characteristics for use in the second mode of operation, e.g. using predetermined valve characteristics without correction, are also within the scope of the invention.

Variable Aperture Discharge (VAD) Mode

Figure 7:
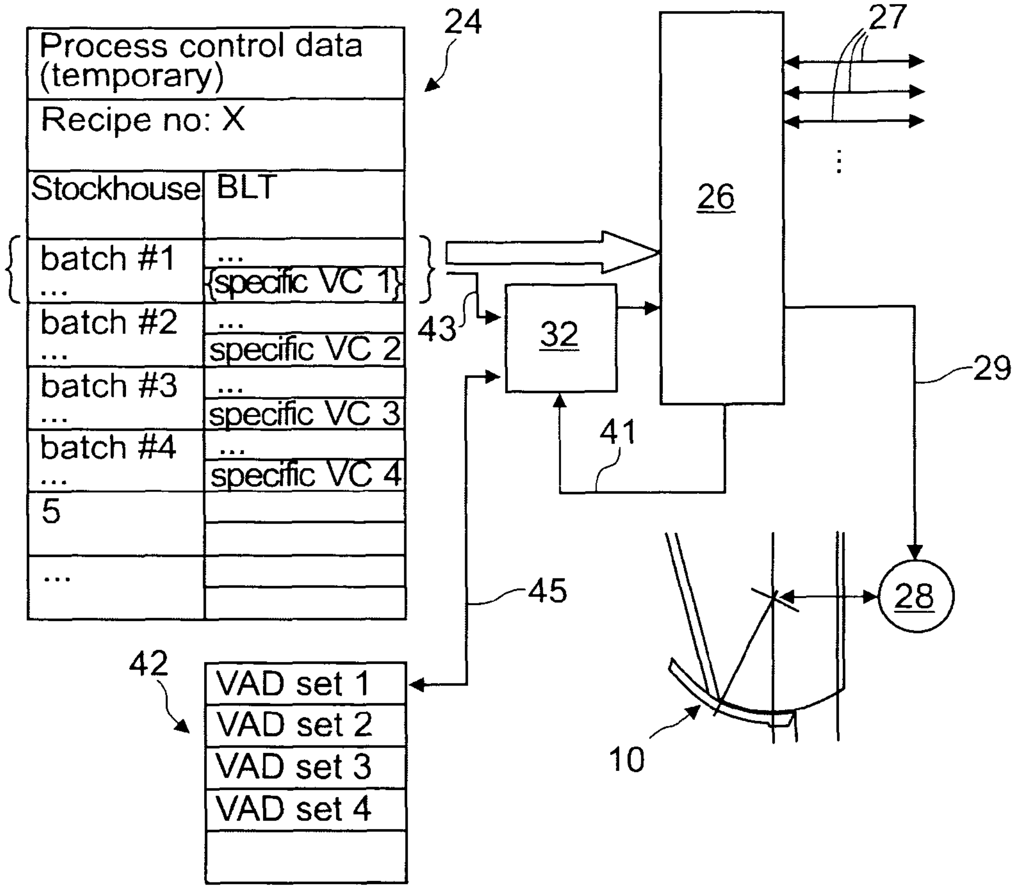
FIG. 7 is a flow chart schematically illustrating data flow in connection with adjusting the flow rate according to the present invention.

This section describes, with reference to FIGS. 7-8, a preferred mode of adjusting the flow rate in accordance with the invention, hereinafter named VAD mode.

Figure 8:
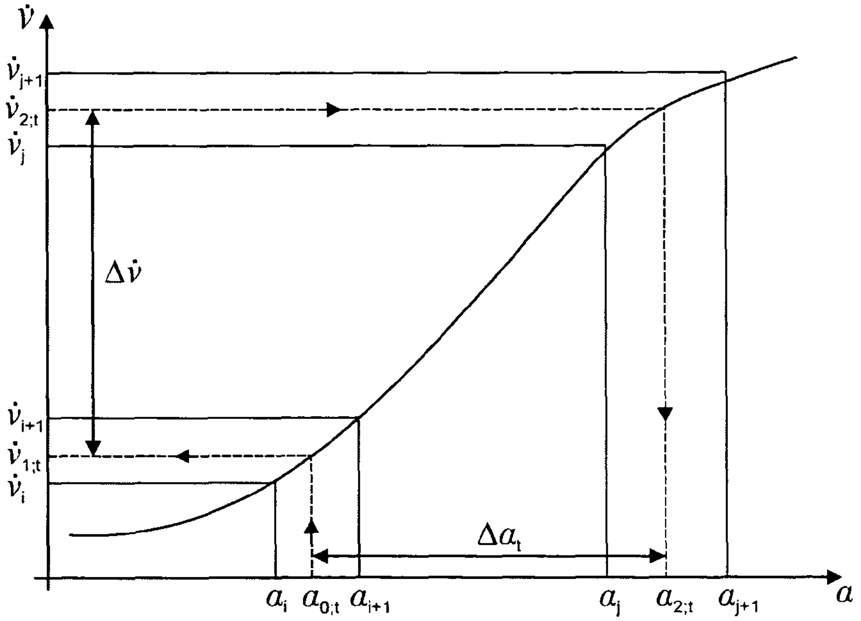
FIG. 8 is a graph of a specific valve characteristic illustrating steps used in connection with correcting and with updating each of plural valve settings for use in the discharge of a given batch.

As illustrated by means of a tabular representation of a data structure 42 in FIG. 8 (see identifier "VAD set 1" . . . "VAD set 4"), a respective set of data is stored for each batch occurring in the charging cycle. Each set "VAD set 1" . . . "VAD set 4" comprises plural valve settings respectively, each valve setting being associated to a different stage in the discharge process of the respective batch.

As will be understood, the discharge process of any given batch can be subdivided into different successive stages, each corresponding to a different operating status of the distribution device that controls the distribution of charge material during discharge according to a desired distribution pattern. In particular and most preferably, each stage corresponds to a different pivoting i.e. tilting position of a distribution chute of the charging device. Alternatively, the discharge process may be subdivided into successive stages that correspond to a full revolution of the distribution chute respectively or any other suitable parameter related to the desired discharge pattern. The different stages for which a set, e.g. "VAD set 1", includes an associated valve setting can be determined using the top charging parameters (column "BLT") provided in the data structure 24 for the respective batch.

A set "VAD set 1" . . . "VAD set 4" hence represents a temporal sequence of variable valve settings to be used in succession during a discharge of a given batch for operating flow control valve 10 in synchronization with the operating states of the distribution device. Even though illustrated by a separate data structure 42, the sets "VAD set 1" . . . "VAD set 4" may be stored in any suitable form, separately or as part of another data structure, e.g. data structure 24, in a data memory e.g. in non-retentive memory of a PC type computer system implementing the HMI of a PLC of the process control system 26.

In case of a flow control valve 10 of the type as illustrated in FIG. 1, the valve settings typically represent opening angle values α, as used for illustration purposes hereinafter. The sets of plural valve settings may be stored in any suitable format, e.g. as a fixed length data array, the array length corresponding to the number of possible discrete chute positions, with array items being defined only for those chute positions that are used in the discharge of the respective batch. The used chute positions can be determined e.g. using the data structure 24.

For the discharge of a given batch in VAD mode, the control system 26 uses the respective set of valve settings "VAD set 1" . . . "VAD set 4" to operate the flow control valve 10, as illustrated by arrow 29 in FIG. 8. More specifically, the control system 26 operates the flow control valve 10 at a constant valve opening (i.e. valve aperture) during each different stage of the discharge according to the associated valve setting. However, as opposed to the initial valve characteristic correction mode, during a batch discharge the valve opening may vary from stage to stage, e.g. from pivoting position to pivoting position of the chute, in accordance with the associated valve settings. The valve setting can therefore vary each time the operating state of the distribution device, e.g. the pivoting position of the distribution chute, changes. On the other hand, as opposed to the approach proposed in EP 0 204 935, no "on-line" feedback control of the valve setting is performed during the discharge.

In fact, in VAD mode, the control system 26 determines the actual average flow rate at which charge material is discharged during each stage respectively, e.g. using the hopper weighing equipment connected to the control system 26, for a subsequent offline correction of the associated valve settings as will be set out below.

Data processing in VAD mode includes the following main aspects:

i) initializing/updating the valve settings of the set stored for a given batch in function of a requested flow rate setpoint;

ii) correcting the valve settings of the set stored for a given batch in offline manner, primarily in function of the actual average flow rate determined for each associated stage.

According to the embodiment illustrated in FIG. 8, the module 32 is configured to perform the above steps. Other implementations are equally within the scope of the invention. In the preferred embodiment, to perform steps i) and ii) the module 32 uses the specific valve characteristics "specific VC1" . . . "specific VC4" of data structure 24 as resulting from operation in the characteristic correction mode.

Step i) is performed typically prior to discharge of a given batch, and necessary only initially or in case the flow rate setpoint changes. Step ii) is performed typically after discharge of the given batch. Preferred embodiments of the above steps i) to ii) are as follows:

i) Initializing/Updating the Valve Settings

In VAD mode, before discharging a given batch of the charging cycle, the following data is provided, e.g. to the module 32:

- the previous flow rate setpoint $\dot{V}_{LAST}$ used for the preceding discharge (if any) of the given batch, e.g. provided according to arrow 41 from the control system 26;
- the requested flow rate setpoint $\dot{V}_{SP}$ to be used for the discharge of the given batch, e.g. calculated as set out above for step a) and provided according to arrow 41;
- the specific valve characteristic, e.g. "specific VC 1", of the given batch as stored in the data structure 24, provided as illustrated by arrow 43;
- the set of valve settings, e.g. "VAD set 1", stored for the given batch, as illustrated by arrow 45.

Prior to the first discharge of a given batch in VAD mode, its respective set of valve settings (e.g. "VAD set 1") is initialized. To this effect, a valve setting is defined for each stage in the discharge, e.g. for each used pivoting position as derived from data structure 24. These valve settings are then all initialized to the valve setting that corresponds the requested flow rate setpoint $\dot{V}_{SP}$ in accordance with the valve characteristic (e.g. "specific VC 1") specific to the given batch, preferably obtained according to the according valve characteristic correction mode described hereinabove.

At subsequent discharges in VAD mode, any significant change of the currently requested flow rate setpoint $\dot{V}_{SP}$ with respect to the previous flow rate setpoint $\dot{V}_{LAST}$ preferably triggers an update of each of the valve settings of the set stored for the given batch. To this effect, the absolute difference between the previous flow rate setpoint and the setpoint for the next discharge is calculated and compared to a predetermined variation tolerance according to:

$$|\dot{V}_{LAST}-\dot{V}_{SP}|>T_3 \tag{12}$$

where $T_3$ is a typically user-defined variation tolerance, that is predetermined e.g. using the HMI.

If inequality (12) is satisfied, an updated value for each valve setting of the set stored for the given batch is calculated as follows:

$$\alpha_t = \alpha_{0;t} + \Delta\alpha_t \qquad \Delta\dot{V} = \dot{V}_{LAST} - \dot{V}_{SP} \tag{13}$$

where $\alpha_t$ updated valve setting (e.g. opening angle of flow control valve 10) for stage t, e.g. for chute position t $\alpha_{0;t}$ previous valve setting for stage t $\Delta\alpha_t$ updating term for stage t $\dot{V}_{LAST}$ previous flow rate set point $\dot{V}_{SP}$ requested flow rate set point (for the next discharge)

$\Delta\dot{V}$ flow rate variation between requested flow rate setpoint and previous flow rate setpoint The value of the updating term $\Delta\alpha_t$ is determined to correspond to the flow rate variation $\Delta\dot{V}$ based on the specific valve characteristic, which is associated to the given batch to be discharged. As illustrated in FIG. 8, updating is preferably executed as follows:

The valve characteristic is used to determine a first flow rate $\dot{V}_{1;t}$ that corresponds to the previous stored flow rate setpoint $\alpha_{0;t}$ by linear interpolation according to:

$$\dot{V}_{1;t} = \dot{V}_i + (\alpha_{0,t} - \alpha_i)\cdot\frac{(\dot{V}_{i+1} - \dot{V}_i)}{(\alpha_{i+1} - \alpha_i)} \tag{14}$$

where i identifies the sequence index of the valve characteristic such that $\alpha_i \le \alpha_{0;t} \le \alpha_{i+1}$ as illustrated in FIG. 8.

A second flow rate $\dot{V}_{2;t}$ is then determined as the sum of the first flow rate $\dot{V}_{1;t}$ and the setpoint variation $\Delta\dot{V}$ according to:

$$\dot{V}_{2;t} = \dot{V}_{1;t} + \Delta\dot{V} \tag{15}$$

where the setpoint variation $\Delta\dot{V}$ may be positive or negative, FIG. 8 giving an example for $\Delta\dot{V}>0$.

A second valve setting $\alpha_{2;t}$ that corresponds to this second flow rate $\dot{V}_{2;t}$ is then also determined by linear interpolation, according to:

$$\alpha_{2;t} = \alpha_j + (\dot{V}_{2;t} - \dot{V}_j)\cdot\frac{(\alpha_{j+1} - \alpha_j)}{(\dot{V}_{j+1} - \dot{V}_j)} \tag{16}$$

where j identifies the sequence index of the valve characteristic such that $\dot{V}_j \le \dot{V}_{2;j} < \dot{V}_{j+1}$, as illustrated in FIG. 8.

The updating term $\Delta\alpha_t$ for the valve setting in question is then determined using the second valve setting $\alpha_{2;t}$ according to $$\Delta\alpha_t = \alpha_{2;t} - \alpha_{0,t} = \alpha_j + (\dot{V}_{2,t} - \dot{V}_j)\cdot\frac{(\alpha_{j+1} - \alpha_j)}{(\dot{V}_{j+1} - \dot{V}_j)} - \alpha_{0,t} \tag{17}$$

In other words, considering equations (13) and (17), the valve setting $\alpha_t$ is updated to be equal to the second valve setting $\alpha_{2;t}$. As will be appreciated, updating the valve setting in function of the requested flow rate setpoint is thus preferably implemented by modifying the previous opening angle $\alpha_{0;t}$ for each stage by the local variation $\Delta\alpha_t$ that corresponds to the flow rate setpoint variation of $\Delta\dot{V}$ according to the specific valve characteristic see FIG. 8.

Updated valve settings are preferably limited according to:

$$\alpha_t = \begin{cases} \alpha_{min}, & \alpha_{0;t} + \Delta\alpha_t < \alpha_{min} \\ \alpha_{0;t} + \Delta\alpha_t, & \alpha_{min} \le \alpha_{0;t} + \Delta\alpha_t \le \alpha_{max} \\ \alpha_{max}, & \alpha_{0;t} + \Delta\alpha_t > \alpha_{max} \end{cases}, \tag{18}$$

with $\alpha_{min}$ and $\alpha_{max}$ being the minimum and maximum allowable valve settings respectively, and further preferably according to:

$$\alpha_t = \begin{cases} \overline{\alpha} - \frac{S_1}{2}, & \alpha_{0;t} + \Delta\alpha_t < \overline{\alpha} - \frac{S_1}{2} \\ \alpha_{0;t} + \Delta\alpha_t, & \overline{\alpha} - \frac{S_1}{2} \le \alpha_{0;t} + \Delta\alpha_t \le \overline{\alpha} + \frac{S_1}{2} \\ \overline{\alpha} + \frac{S_1}{2}, & \alpha_{0;t} + \Delta\alpha_t > \overline{\alpha} + \frac{S_1}{2} \end{cases}, \tag{19}$$

with $\overline{\alpha}$ being the average valve setting value across all valve settings of the set and $S_1$ being a predetermined, typically user-defined span limit to ensure that said each updated valve setting is within a predetermined range about the average value.

Initializing and updating the valve settings for each stage as set out above is a preferred but auxiliary aspect of adjusting the flow rate according to the invention, since it may not be required in case an invariable flow rate setpoint is associated to each batch of the charging cycle. The key aspect of adjusting the flow rate according to the invention corresponds to the above step ii) of correcting the valve settings, which is preferably executed as follows:

ii) Correcting The Valve Settings

In VAD mode, each of the valve settings of the set stored for a given batch is corrected in offline manner respectively. The correction of a valve setting depends mainly on an actual average flow rate determined for the associated stage. A preferred mode of correction is implemented as follows:

For correcting the valve settings after discharge, the following data is provided:

- the flow rate setpoint $\dot{V}_{SP}$ used for the discharge of the given batch, e.g. provided to the module 32 by the process control system 26 according to arrow 41;
- the actual average flow rates $\dot{V}_{Act;t}$ determined for each stage t in the discharge, in particular for each chute tilting position, e.g. provided to the module 32 by the process control system 26 according to arrow 41,
- the specific valve characteristic, e.g. "specific VC 1", of the given batch as stored in the data structure 24 and provided to the module 32 as illustrated by arrow 43;
- the set of valve settings, e.g. "VAD set 1", currently stored for the given batch, as illustrated by arrow 45.

The actual average flow rate $\dot{V}_{Act;t}$ for each stage t is determined after the given batch has been completely discharged, or after a given stage of the discharge is completed. These actual average flow rates are determined in any suitable manner, e.g. analogous to the flow rate calculation described hereinabove for step b), i.e. by the process control system 26 using connected weighing equipment.

Using the determined actual average flow rates $\dot{V}_{Act;t}$, a flow rate deviation (flow rate error) is determined for each stage t respectively according to:

$$\Delta\dot{V}_t = \dot{V}_{SP} - \dot{V}_{Act;t} \tag{20}$$

A correction for any given valve setting is performed in case the absolute value of the flow rate deviation $\Delta\dot{V}_t$ for the associated stage exceeds a predetermined deviation tolerance according to inequality:

$$|\Delta\dot{V}_t| > T_4 \tag{21}$$

where $T_4$ is a typically user-defined deviation tolerance, that is predetermined e.g. using the HMI.

In order to adjust the flow rate during a subsequent discharge of the given batch to the requested flow rate, each valve setting for which inequality (21) holds is corrected offline according to:

$$\alpha_t' = \alpha_t + \frac{\Delta\alpha_t}{K_2} \tag{22}$$

where $\alpha_t'$ is the corrected valve setting, $\alpha_t$ is the currently stored uncorrected valve setting associated to stage t, and $\Delta\alpha_t$ is a correction term to be determined for each stage t respectively, and $K_2$ is a typically user-defined predetermined constant to prevent overcorrection, with $K_2$ preferably such that $K_2 \geq 2$.

The correction term $\Delta\alpha_t$ for each stage t is preferably determined using linear interpolation on the valve characteristic specific to the given bath in similar manner to the updating term as described above. However, the value of flow rate deviation $\Delta\dot{V}_t$ will normally be different for each stage t. By reference to FIG. 8, correction is thus preferably executed as follows:

The valve characteristic is used to determine a first flow rate $\dot{V}_{1;t}$ that corresponds to the stored uncorrected flow rate setpoint $\alpha_t$ by linear interpolation according to:

$$\dot{V}_{1;t} = \dot{V}_i + (\alpha_t - \alpha_i) \cdot \frac{(\dot{V}_{i+1} - \dot{V}_i)}{(\alpha_{i+1} - \alpha_i)} \tag{23}$$

where i identifies the sequence index of the valve characteristic such that $\alpha_i \leq \alpha_t < \alpha_{i+1}$ as illustrated in FIG. 8.

A second flow rate $\dot{V}_{2;t}$ is then determined as the sum of the first flow rate $\dot{V}_{1;t}$ and the flow rate deviation $\Delta\dot{V}_t$ for the associated stage t according to:

$$\dot{V}_{2;t} = \dot{V}_{1;t} + \Delta\dot{V}_t \tag{24}$$

where the setpoint variation $\Delta\dot{V}_t$ may be positive or negative.

A second valve setting $\alpha_{2;t}$ that corresponds to this second flow rate $\dot{V}_{2;t}$ is then also determined by linear interpolation, according to:

$$\alpha_{2;t} = \alpha_j + (\dot{V}_{2;t} - \dot{V}_j) \cdot \frac{(\alpha_{j+1} - \alpha_j)}{(\dot{V}_{j+1} - \dot{V}_j)} \tag{25}$$

where j identifies the sequence index of the valve characteristic such that $\dot{V}_j \leq \dot{V}_{2;j} < \dot{V}_{j+1}$ and $\alpha_j \leq \alpha_{2;t} < \alpha_{j+1}$, as illustrated in FIG. 8.

The offline correction term $\Delta\alpha_t$ for the valve setting in question i.e. for stage t is then determined using the second valve setting $\alpha_{2;t}$ of (16) according to $$\Delta\alpha_t = \alpha_{2;t} - \alpha_t = \alpha_j + (\dot{V}_{2,t} - \dot{V}_j) \cdot \frac{(\alpha_{j+1} - \alpha_j)}{(\dot{V}_{j+1} - \dot{V}_j)} - \alpha_t \tag{26}$$

For each stage t at which a significant flow rate deviation occurred, i.e. for which inequality (21) is satisfied, the associated uncorrected valve setting $\alpha_t$ is then corrected by applying the corresponding correction term $\Delta\alpha_t$ according to equation (22).

Similar to equations (18) and (19), correction of the valve settings is preferably so that each corrected valve setting $\alpha_t'$ is limited according to:

$$\alpha_t' = \begin{cases} \alpha_{min}, & \alpha_t + \frac{\Delta\alpha_t}{K_2} < \alpha_{min} \\ \alpha_t + \frac{\Delta\alpha_t}{K_2}, & \alpha_{min} \leq \alpha_t + \frac{\Delta\alpha_t}{K_2} \leq \alpha_{max} \\ \alpha_{max}, & \alpha_t + \frac{\Delta\alpha_t}{K_{2t}} > \alpha_{max} \end{cases}, \tag{27}$$

with $\alpha_{min}$ and $\alpha_{max}$ being the minimum and maximum allowable valve settings respectively, and further preferably according to:

$$\alpha_t' = \begin{cases} \overline{\alpha} - \frac{S_1}{2}, & \alpha_t + \frac{\Delta\alpha_t}{K_2} < \overline{\alpha} - \frac{S_1}{2} \\ \alpha_t + \frac{\Delta\alpha_t}{K_2}, & \overline{\alpha} - \frac{S_1}{2} \leq \alpha_t + \frac{\Delta\alpha_t}{K_2} \leq \overline{\alpha} + \frac{S_1}{2} \\ \overline{\alpha} + \frac{S_1}{2}, & \alpha_t + \frac{\Delta\alpha_t}{K_2} > \overline{\alpha} + \frac{S_1}{2} \end{cases}, \tag{28}$$

An exemplary program sequence in pseudo-code for performing correction as set out above in section ii) is as follows:

IF BLT results transmitted = TRUE THEN
FOR i = 1 TO number of tilting positions
IF $t_i$ < > "" AND $t_i$ < > 0 THEN "$t_i$ time spent on chute position i "
$\Delta\dot{V}_i = \dot{V}_{SP} - \dot{V}_{i;actual}$ ; $\dot{V}_{i;actual}$ is the actual flow rate for chute position i
IF $|\Delta\dot{V}_i| \geq T_4$ THEN
$\Delta\alpha_i$ = FUNCTION ReturnDeltaAlpha($\alpha_i$, $\Delta\dot{V}_i$)
$\alpha_i' = \alpha_i + \frac{\Delta\alpha_i}{K_2}$
ELSE
$\alpha'_i = \alpha_i$
ENDIF
END IF
NEXT i
$\overline{\alpha}$= ReturnAverageAngle(α( ) , number of tilting positions)
FOR i = 1 TO number of tilting positions
$\alpha'_i$ = MGAngleLimits($\alpha_i$, $\overline{\alpha}$, ChutePositionUsed, $\alpha_{max}$, $\alpha_{min}$, $S_1$)
NEXT i
$\dot{V}_{last} = \dot{V}_{SP}$
BLT results transmitted = FALSE
END IF

FUNCTIONS

FUNCTION ReturnDeltaAlpha(α, ΔV)
i = 1
WHILE $\alpha_{Curve,i} < \alpha$
i = i + 1
WEND
i = i − 1
$V_1 = V_{Curve,i} + (\alpha - \alpha_{Curve,i}) \cdot \frac{(V_{Curve,i+1} - V_{Curve,i})}{(\alpha_{Curve,i+1} - \alpha_{Curve,i})}$
$V_2 = V_1 + \Delta V$
i = 1
WHILE $V_{curve,i} < V_2$
i = i + 1
WEND
i = i − 1
ReturnDeltaAlpha= $\alpha_{Curve,i} + (V_2 - V_{Curve,i}) \cdot \frac{(\alpha_{Curve,i+1} - \alpha_{Curve,i})}{(V_{Curve,i+1} - V_{Curve,i})} - \alpha$
END FUNCTION FUNCTION MGAngleLimits ($\alpha$, $\bar{\alpha}$, ChutePositionUsed, $\alpha_{max}$, $\alpha_{min}$, $S_1$)

```
IF ChutePositionUsed < > 0 THEN
  MGAngleLimits = α
  IF α > ᾱ + S1/2 THEN
    MGAngleLimits= ᾱ + S1/2
  END IF
  IF α < ᾱ − S1/2 THEN
    MGAngleLimits= ᾱ − S1/2
  END IF
  IF α > αmax THEN
    MGAngleLimits = αmax
  END IF
  IF α < αmin THEN
    MGAngleLimits = αmin
  END IF
END IF
END FUNCTION
```

FUNCTION ReturnAverageAngle ("TargetRange", NumberOfTiltingPositions)

```
sum = 0
k = 0
FOR i = 1 To NumberOfTiltingPositions
  IF TargetRange(i) < > "" THEN
    sum = sum + TargetRange(i)
    k = k + 1
  END IF
NEXT i
IF k < > 0 THEN
  ReturnAverageAngle = sum / k
END IF
END FUNCTION
FUNCTION GetAlpha(V̇)
i = 1
IF V̇ < > 0 THEN
  WHILE V̇i < V̇ "Flow rate with index i of the characteristic curve < Flow rate setpoint"
    i = i + 1
  WEND
  i = i − 1
  GetAlpha = αi + (V̇ − V̇i)·(αi+1 − αi)/(V̇i+1 − V̇i)
END IF
END FUNCTION
```

Similarly, an exemplary program sequence in pseudo-code for performing updating as set out above in section i) is as follows:

-continued

```
IF V̇SP ≠""THEN ("Flowrate setpoint ≠"" ")
  ΔV̇ = V̇SP − V̇Last
  FOR i = 1 TO number of tilting positions
    IF ti <> "" AND ti <> 0 THEN " ti time spent on chute position i "
      IF α0;i = "" OR α0;i= 0 THEN
        αi= GetAlpha(V̇SP)
      ELSE
        IF |ΔV̇|≥T3 THEN
          αi=α0;i+ ReturnDeltaAlpha(α0;i, ΔV)
        ELSE
          αi=α0;i
        ENDIF
      END IF
    ELSE
      αi=""
    END IF
  NEXT i
  ᾱ = ReturnAverageAngle(α( ),number of tilting positions)
  FOR i = 1 TO number of tilting positions
    αi=MGAngleLimits(αi, ᾱ, ChutePositionUsed, αmax , αmin , S1)
  NEXT i
  Vlast = VSP
END IF
```

Although the VAD mode as described above refers to a single set of valve settings per batch, it will be understood that, in case of a multiple-hopper installation, an independent set of valve settings for each flow control valve is stored for each batch respectively.

In summary, adjusting the flow rate according to the above VAD mode varies the valve opening during discharging of a batch without the need for online feedback control. After the batch has been discharged, the actual average flow rate per stage, e.g. per used chute position, is compared with the initially requested flow rate set point. After each discharge, the valve aperture for each stage is gradually corrected, if required, in order to reach the desired flow rate set point for each stage. For each stage during the discharge, the material gate aperture is constant but can vary from stage to stage, e.g. in accordance with different chute positions. In order to provide ideal correction results in VAD mode, several initial batch discharges are preferably carried out in valve characteristic correction mode as described hereinabove.

The invention claimed is:

1. A method of charge material flow rate adjustment in a charging process of a shaft furnace, wherein:

batches of charge material are discharged into said furnace from a top hopper using a flow control valve associated to said top hopper for controlling a flow rate of charge material fed to a distribution device for controlling the distribution of charge material inside the furnace, each batch representing a quantity of charge material that is stored intermediately in said top hopper in order to be discharged into the furnace;

said method comprising:

storing a respective set of plural valve settings for each batch, each valve setting of a set being associated to a different stage during the discharge of a respective batch from the respective top hopper, so that each different stage corresponds to a different operating status of said distribution device during the discharge of the respective batch;

for a discharge of a given batch:

at each stage in the discharge of said given batch:

operating said flow control valve at a constant valve opening on the basis of the valve setting associated to said stage;

determining an actual average flow rate at which charge material is discharged during said stage; and correcting each of said plural valve settings of the set stored for said given batch offline in function of the actual average flow rate determined for the associated stage.

2. The method according to claim 1, wherein correcting each of said plural valve settings of the set stored for said given batch offline is in function of the actual average flow rate determined for the associated stage and of a requested flow rate setpoint.

3. The method according to claim 2, further comprising prior to the discharge of a given batch:

obtaining a requested flow rate setpoint for said given batch;

updating each of said plural valve settings of the set stored for said given batch in function of said requested flow rate setpoint.

4. The method according to claim 2, further comprising providing a specific valve characteristic for each batch of charge material, each specific valve characteristic being associated to one batch and indicating a relation between flow rate and valve setting of said flow control valve for the associated batch, wherein correcting a stored valve setting of the set stored for a given batch offline in function of the actual average flow rate determined for the associated stage and of said requested flow rate setpoint comprises:

determining a flow rate deviation between said requested flow rate setpoint and said actual average flow rate determined for the associated stage;

and, if said flow rate deviation exceeds a predetermined deviation tolerance:

determining a first flow rate corresponding to said stored valve setting using the specific valve characteristic associated to said given batch;

determining a second flow rate as the sum of said first flow rate and said flow rate deviation;

determining a second valve setting corresponding to said second flow rate using the specific valve characteristic associated to said given batch;

determining a correction term as a function of the difference between said second valve setting and said stored valve setting;

applying said correction term to said stored valve setting to obtain a corrected stored valve setting.

5. The method according to claim 4, wherein updating a stored valve setting of the set stored for a given batch in function of said requested flow rate setpoint comprises:

obtaining a previous flow rate setpoint used for the preceding discharge of a given batch;

determining a flow rate variation between said requested flow rate setpoint and said previous flow rate setpoint;

and, in case said flow rate variation exceeds a predetermined variation tolerance:

determining a first flow rate corresponding to said stored valve setting using the specific valve characteristic associated to said given batch;

determining a second flow rate as the sum of said first flow rate and said flow rate variation;

determining a second valve setting corresponding to said second flow rate using the specific valve characteristic associated to said given batch;

using said second valve setting to update said stored valve setting.

6. The method according to claim 1, wherein correcting each of said plural valve settings of the set stored for a given batch further comprises:

determining an average valve setting value across said plural valve settings of said set;

ensuring that each corrected valve setting of said set is within a predetermined range about said average valve setting value.

7. System for charge material flow rate adjustment in a charging installation for a shaft furnace, said installation comprising a distribution device for controlling the distribution of charge material inside the furnace, a top hopper for intermediately storing batches of charge material to be discharged into the furnace and a flow control valve associated to said hopper for controlling the flow rate of charge material to said distribution device, each batch representing a quantity of charge material that is stored intermediately in said top hopper in order to be discharged into the furnace, said system comprising:

a data memory storing a respective set of plural valve settings for each batch, each valve setting of a set being associated to a different stage during the discharge of the respective batch from the respective top hopper, so that each different stage corresponds to a different operating status of said distribution device during the discharge of the respective batch;

a programmable computing device programmed to execute the following for a discharge of a given batch:

at each stage in the discharge of said given batch:

operate said flow control valve at a constant valve opening on the basis of the valve setting associated to said stage;

determine an actual average flow rate at which charge material is discharged during said stage; and correct each of said plural valve settings of the set stored for said given batch offline in function of the actual average flow rate determined for the associated stage.

8. The system according to claim 7, wherein said programmable computing device is programmed to correct each of said plural valve settings of the set stored for said given batch offline in function of the actual average flow rate determined for the associated stage and of a requested flow rate setpoint.

9. The system according to claim 7, wherein said programmable computing device is programmed to execute the following prior to the discharge of a given batch:

obtain a requested flow rate setpoint for said given batch;

update each of said plural valve settings of the set stored for said given batch in function of said requested flow rate setpoint.

10. The system according to claim 8, further comprising a data memory storing a specific valve characteristic for each batch of charge material, each specific valve characteristic being associated to one batch and indicating the relation between flow rate and valve setting of said flow control valve for the associated batch, and wherein and said programmable computing device is programmed so that correcting a stored valve setting of the set stored for a given batch offline in function of the actual average flow rate determined for the associated stage and of said requested flow rate setpoint comprises:

determining a flow rate deviation between said requested flow rate setpoint and said actual average flow rate determined for the associated stage;

and, if said flow rate deviation exceeds a predetermined deviation tolerance:

determining a first flow rate corresponding to said stored valve setting using the specific valve characteristic associated to said given batch;

determining a second flow rate as the sum of said first flow rate and said flow rate deviation;

determining a second valve setting corresponding to said second flow rate using the specific valve characteristic associated to said given batch;

determining a correction term as a function of the difference between said second valve setting and said stored valve setting;

applying said correction term to said stored valve setting to obtain a corrected stored valve setting.

11. The system according to claim 10, wherein said programmable computing device is programmed so that updating a stored valve setting of the set stored for a given batch in function of said requested flow rate setpoint comprises: obtaining a previous flow rate setpoint used for the preceding discharge of a given batch;

determining a flow rate variation between said requested flow rate setpoint and said previous flow rate setpoint;

and, if said flow rate variation exceeds a predetermined variation tolerance:

determining a first flow rate corresponding to said stored valve setting using the specific valve characteristic associated to said given batch;

determining a second flow rate as the sum of said first flow rate and said flow rate variation;

determining a second valve setting corresponding to said second flow rate using the specific valve characteristic associated to said given batch;

using said second valve setting to update said stored valve setting.

12. The system according to claim 7, wherein said programmable computing device is programmed so that correcting each of said plural valve settings of the set stored for a given batch further comprises:

determining an average valve setting value across said plural valve settings of said set;

ensuring that each corrected valve setting of said set is within a predetermined range about said average valve setting value.

13. System for charge material flow rate adjustment in a charging installation for a blast furnace, said installation comprising a distribution device including a rotatable and pivotable distribution chute for controlling the distribution of charge material inside the furnace, a top hopper for intermediately storing batches of charge material to be discharged into the furnace and a flow control valve associated to said hopper for controlling the flow rate of charge material to said distribution device, each batch representing a quantity of charge material that is stored intermediately in said top hopper in order to be discharged into the furnace, wherein said system comprises:

a data memory storing a respective set of plural valve settings for each batch, each valve setting of a set being associated to a different stage during the discharge of the respective batch from the respective top hopper, so that each different stage corresponds to a different operating status of said distribution device during the discharge of the respective batch, said operating status in being a pivoting position of said distribution chute;

a programmable computing device programmed to execute the following for a discharge of a given batch: at each stage in the discharge of said given batch:

operate said flow control valve at a constant valve opening on the basis of the valve setting associated to said stage;

determine an actual average flow rate at which charge material is discharged during said stage; and correct each of said plural valve settings of the set stored for said given batch offline in function of the actual average flow rate determined for the associated stage.

14. The system according to claim 13, wherein said programmable computing device is programmed to correct each of said plural valve settings of the set stored for said given batch offline in function of the actual average flow rate determined for the associated stage and of a requested flow rate setpoint.

15. The system according to claim 14, wherein said programmable computing device is programmed to execute the following prior to the discharge of a given batch:

obtain a requested flow rate setpoint for said given batch;

update each of said plural valve settings of the set stored for said given batch in function of said requested flow rate setpoint.

16. The system according to claim 14, further comprising a data memory storing a specific valve characteristic for each batch of charge material, each specific valve characteristic being associated to one batch and indicating the relation between flow rate and valve setting of said flow control valve for the associated batch, and wherein and said programmable computing device is programmed so that correcting a stored valve setting of the set stored for a given batch offline in function of the actual average flow rate determined for the associated stage and of said requested flow rate setpoint comprises:

determining a flow rate deviation between said requested flow rate setpoint and said actual average flow rate determined for the associated stage;

and, if said flow rate deviation exceeds a predetermined deviation tolerance:

determining a first flow rate corresponding to said stored valve setting using the specific valve characteristic associated to said given batch;

determining a second flow rate as the sum of said first flow rate and said flow rate deviation;

determining a second valve setting corresponding to said second flow rate using the specific valve characteristic associated to said given batch;

determining a correction term as a function of the difference between said second valve setting and said stored valve setting;

applying said correction term to said stored valve setting to obtain a corrected stored valve setting.

17. The system according to claim 16, wherein said programmable computing device is programmed so that updating a stored valve setting of the set stored for a given batch in function of said requested flow rate setpoint comprises: obtaining a previous flow rate setpoint used for the preceding discharge of a given batch;

determining a flow rate variation between said requested flow rate setpoint and said previous flow rate setpoint;

and, if said flow rate variation exceeds a predetermined variation tolerance:

determining a first flow rate corresponding to said stored valve setting using the specific valve characteristic associated to said given batch;

determining a second flow rate as the sum of said first flow rate and said flow rate variation;

determining a second valve setting corresponding to said second flow rate using the specific valve characteristic associated to said given batch;

using said second valve setting to update said stored valve setting.

18. The system according to claim 13, wherein said programmable computing device is programmed so that correcting each of said plural valve settings of the set stored for a given batch further comprises:

determining an average valve setting value across said plural valve settings of said set;

ensuring that each corrected valve setting of said set is within a predetermined range about said average valve setting value.

* * * * *